United States Patent
Chen et al.

(10) Patent No.: US 10,957,262 B2
(45) Date of Patent: Mar. 23, 2021

(54) INFORMATION TERMINAL INCLUDING A BACKGROUND ILLUMINATION LIGHT

(71) Applicant: GUANGDONG XIAYE HOUSEHOLD ELECTRICAL APPLIANCES CO., LTD, Guangdong (CN)

(72) Inventors: Ziping Chen, Guangdong (CN); Lei Huang, Guangdong (CN); Mengzhen Chen, Guangdong (CN)

(73) Assignee: GUANGDONG XIAYE HOUSEHOLD ELECTRICAL APPLIANCES CO., LTD., Guangdong (CN)

( * ) Notice: Subject to any disclaimer, the term of this patent is extended or adjusted under 35 U.S.C. 154(b) by 0 days.

(21) Appl. No.: 16/617,991

(22) PCT Filed: May 30, 2018

(86) PCT No.: PCT/CN2018/089023
§ 371 (c)(1),
(2) Date: Nov. 27, 2019

(87) PCT Pub. No.: WO2018/219294
PCT Pub. Date: Dec. 6, 2018

(65) Prior Publication Data
US 2020/0126494 A1    Apr. 23, 2020

(30) Foreign Application Priority Data

Jun. 2, 2017    (CN) .......................... 201710415778.2

(51) Int. Cl.
*G06F 3/14*    (2006.01)
*G09G 3/34*    (2006.01)
*G09G 5/10*    (2006.01)

(52) U.S. Cl.
CPC ............. *G09G 3/3406* (2013.01); *G09G 5/10* (2013.01); *G09G 2320/062* (2013.01);
(Continued)

(58) Field of Classification Search
CPC ................ G06F 3/14; G09G 2320/062; G09G 2320/0646; G09G 2320/0666;
(Continued)

(56) References Cited

U.S. PATENT DOCUMENTS

2010/0265263 A1    10/2010  Hsu et al.
2010/0295873 A1*   11/2010  Dodge .................... G09G 5/00
                                                    345/690
(Continued)

FOREIGN PATENT DOCUMENTS

CN    101193140 A    6/2008
CN    101436394 A    5/2009
(Continued)

OTHER PUBLICATIONS

U.S. Appl. No. 16/617,980, Information Terminal.
U.S. Appl. No. 16/617,997, Information Terminal.

*Primary Examiner* — Ram A Mistry
(74) *Attorney, Agent, or Firm* — Welsh Flaxman & Gitler LLC (57) ABSTRACT

An information terminal includes a background illumination light for illuminating a background environment within the viewing angle range of the user, a camera for acquiring a photo analog signal or a photo digital signal of the background environment within the viewing angle rang of the user, a photo capturing unit for converting the photo analog signal or the photo digital signal acquired by the camera into digitized photo data, a photo gray level analysis unit for analyzing the gray level of the photo data and generating state parameters of the background environment within the
(Continued)

viewing angle range of the user according to the configuration parameter of the camera, a background illumination light illumination parameter adjustment unit for adjusting illumination parameters of the background illumination light according to the state parameters, and a display screen display parameter adjustment unit for adjusting a display parameter of a display screen on the basis of the state parameters of the background environment and on the basis of a preset corresponding relationship.

10 Claims, 3 Drawing Sheets

(52) U.S. Cl.
CPC ............... *G09G 2320/0646* (2013.01); *G09G 2320/0666* (2013.01); *G09G 2360/144* (2013.01)

(58) Field of Classification Search
CPC .. G09G 2360/144; G09G 3/3406; G09G 5/10; H04M 1/22; H04M 1/725
See application file for complete search history.

(56) References Cited

U.S. PATENT DOCUMENTS

| | | |
|---|---|---|
| 2011/0032228 A1 | 2/2011 | Ho |
| 2011/0134091 A1* | 6/2011 | Chen .................... G09G 3/3406 345/207 |
| 2011/0181541 A1 | 7/2011 | Kuo |
| 2011/0187733 A1* | 8/2011 | Sun ...................... G09G 3/3406 345/589 |
| 2015/0070406 A1* | 3/2015 | Baek .................... G09G 3/3406 345/690 |

FOREIGN PATENT DOCUMENTS

| | | |
|---|---|---|
| CN | 101534395 B | 2/2011 |
| CN | 102693698 A | 9/2012 |
| CN | 106453888 A | 2/2017 |
| CN | 106502512 A | 3/2017 |
| CN | 106683639 A | 5/2017 |

\* cited by examiner

INFORMATION TERMINAL INCLUDING A BACKGROUND ILLUMINATION LIGHT

This application claims priorities from Chinese patent application of 201710415778.2, entitled an information terminal, filed on Jun. 2, 2017, in National Intellectual Property Administration, PRC.

TECHNICAL FIELD

The present invention relates to a technical field of lighting, in particular to an information terminal.

RELATED ART

At present, the development of internet electronic products such as mobile phones, tablets are on the rise, more and more people are staring at video terminals such as mobile phones for a long time, which causes visual fatigue of human eyes resulting in visual extinction and effects visual health.

Currently, most of the smart phones have their own automatic brightness adjustment mode, the illumination sensor located near the receiver, by the means of recognizing surrounding lighting environment detects the brightness of the surrounding environment, and then calculates the screen display brightness according to the preset algorithm.

However, the user often encounters the brightness display of the screen in the automatic adjustment mode, which does not conform to his visual perception, the reason is that there is an error between the brightness of the surrounding environment detected by the brightness sensor and the visual perception, and the limitation only for brightness regulation. At the same time, for scenes with relatively dark ambient lighting, even if the brightness of the display screen is adjusted, the brightness of the surrounding environment cannot be fully adapted and the user's normal visualization requirement is still needed to be considered. There is no good way to solve the above problems in the industry.

SUMMARY OF THE INVENTION

The object of embodiments of the present invention is to provide an information terminal, which may sample illumination of a background environment based on viewing angle range of a user, control the fill light illumination of the background environment and adjust display parameters such as a brightness and a color temperature of a display screen according to state parameters of the background environment obtained by sampling, and adjust the brightness, the color temperature and other display parameters matching with the illumination state of the background environment within the viewing of the user, so that it is possible for the screen display to match with the visual perception of the user, thereby, it may effectively reduce the visual fatigue of the user during use and protect the visual health of the user.

In order to achieve the object, the embodiments of the present invention provides an information terminal comprising a display screen, a first communication device and a second communication device wherein the information terminal further comprises a background illumination light, a camera, a photo capturing unit, a photo gray level analysis unit, a display-screen display-parameter-adjustment unit and a background-illumination-light illumination-parameter-adjustment unit, the background illumination light is used for illuminating a background environment within a viewing angle range of a user, the camera is used for acquiring a photo analog signal or a photo digital signal of the background environment within the viewing angle range of the user, the photo capturing unit is connected to the camera via the first communication device for converting the photo analog signal or the photo digital signal acquired by the camera into digitized photo data, the photo gray level analysis unit is used for analyzing a gray level of the photo data, and generating a state parameters of the background environment within the viewing angle range of the user according to configuration parameters of the camera, and respectively sending the same to the background-illumination-light illumination-parameter-adjustment unit and the display-screen display-parameter-adjustment unit, the background-illumination-light illumination-parameter-adjustment unit is connected the background illumination light via the second communication device, for adjusting illumination parameters of the background illumination light according to the state parameters, so that the illumination state of the background environment reaches to a preset parameter, wherein the illumination parameters at least include a brightness and/or a color temperature, the display-screen display-parameter-adjustment unit adjusts the display parameters of the display screen according to the state parameters of the background environment on the basis of the preset corresponding relationship, so that the display parameters of the display screen match with the illumination state of the background environment within the viewing angle range of the user, wherein the display parameters at least include a brightness and/or a color temperature.

Preferably the information terminal is connected to the cloud through a network, for transmitting the state parameters of the background environment to the cloud for synchronization, storing the same as a state preset parameter.

Preferably, the information terminal is connected to the cloud through a network, for transmitting parameters of preset corresponding relationship in which the display parameters of the display screen match with the illumination state of the background environment within the viewing angle range of the user to the cloud for synchronization, the cloud stores a user habit list corresponding to the user which includes a user ID corresponding to the user, display parameters of the display screen, illumination parameters and an illumination state of the background light, and a preset corresponding relationship in which the display parameters match with the illumination state of the background environment within the viewing angle range of the user.

Preferably, the display-screen display-parameter-adjustment unit comprises the first adjustment device is used for adjusting the display parameters of the display screen, and changing the preset corresponding relationship between the display parameters of the display screen and the illumination state of the background environment within the viewing angle range of the user after adjusting the display parameters, to generate a first corrected corresponding relationship, wherein, the first adjustment device is a hardware module disposed in the information terminal, or a software module disposed on the display screen.

Preferably, the information terminal is connected to the cloud through network, and the cloud performs data analysis on parameters of the preset corresponding relationship of the background environment and parameters of the first corrected corresponding relationship from several information terminals, generates a universal state preset parameter adapted to a first range and a peculiar state preset parameter adapted to a second range, for the information terminals to acquire the universal state preset parameter or the peculiar state preset parameter which are corresponding to the background environment from the cloud.

Further preferably, the background-illumination-light illumination-parameter-adjustment unit comprises: a second adjustment device for adjusting the illumination parameters of the background illumination light, and after adjusting the illumination parameters, changing the preset corresponding relationship between the display parameters of the display screen and the illumination state of the background environment within the viewing angle range of the user, to generate a second corrected corresponding relationship, wherein, the second adjustment device is a hardware module disposed in the information terminal, or a software module disposed on the display screen.

Preferably, the information terminal is connected to the cloud through a network, for transmitting the preset corresponding relationship in which the display parameters of the display screen match with the illumination state of the background environment within the viewing angle range of the user and the parameters of the second corrected corresponding relationship to the cloud, and the cloud performs data analysis on parameters of the preset corresponding relationship and the parameters of the second corrected corresponding relationship from several information terminals, generating universal preset corresponding relationship parameters adapted to a first range and peculiar preset corresponding relationship parameters adapted to a second range, for the information terminals to acquire the universal preset corresponding relationship parameters or the peculiar preset corresponding relationship parameters in which the display parameters of the display screen match with the illumination state of the background environment within the viewing angle range of the user from the cloud.

Preferably, the state parameters of the background environment at least include a brightness parameter and/or a color temperature parameter.

Preferably, that the background-illumination-light illumination-parameter-adjustment unit is connected to the background illumination light via the second communication device, for adjusting illumination parameters of the background illumination light according to the state parameters, so that the illumination state of the background environment reaches to a preset parameter comprises:

the background-illumination-light illumination-parameter-adjustment unit determines whether the ambient illumination parameter is lower than a minimum of the set illumination parameter according to state parameters of the background environment within the viewing angle range of the user, if not lower than the minimum of the set illumination parameters, the background illumination light is not turned on, if lower than the minimum of the set illumination parameter, based on the preset corresponding relationship between the background light and the compensated light, the background illumination light outputs corresponding illumination parameters according to the state parameters of the background environment, so that the display parameters of the display screen match with the illumination state of the adjusted background environment within the viewing angles range of user.

Preferably, that adjusts the display parameters of the display screen according to the state parameters of the background environment comprises:

determining an absolute value of a target brightness of the display screen according to the state parameters of the background environment and the preset corresponding relationship, determining a display brightness percentage of the display screen according to the absolute value of the target brightness of the display screen, outputting an actual display brightness of the display screen corresponding to the absolute value of the target brightness of the display screen according to the display brightness percentage of the display screen, wherein the actual display brightness of the display screen and the maximum of the absolute value of the brightness of the display screen are calibrated with the display brightness percentage in advance.

The embodiments of the present invention provide an information terminal, which may sample illumination of a background environment based on viewing angle ranges of a user, and control the fill light illumination of the background environment according to state parameters of the background environment obtained by sampling, and adjust the display parameters such as brightness, and the color temperature etc., to match with the state parameters of the background environment within the viewing angle ranges of the user, so that it is possible for the screen display to match with the visual perception of the user, thereby, it may effectively reduce the visual fatigue of the user during use and protect the visual health of the user.

DETAILED DESCRIPTION OF THE INVENTION

The technical scheme of the present invention is further described in detail by figure and embodiments.

In order to better understand the information terminal proposed in the embodiment of the present invention and its working mode, firstly, the visual impact of ambient light on the user viewing the display screen will be described.

During the user watches the display screen, the illumination state of the background environment has a great influence on the visual effect of the display screen. When the human eye watches any object, the size of the pupil can be adjusted according to the brightness of the object, and the brighter the brightness, the smaller the pupil, the lower the brightness, the bigger the pupil. Usually, the visual range of the display screen we are watch is only within 10% of the visual range of our eyes.

For example, when using a 5-inch display screen mobile phone, the mobile phone is placed at a distance of about 30 cm from the eye, the visual solid angle of our eyes is about 120 degrees, and the visual range of the eyes at 30 cm is about 8482 cm2, while the area of the 5-inch display screen mobile phone is no more than 100 cm2, the display screen of the mobile phone is less than 2% of the visual range of the eyes. For example, when using a computer with a 20-inch display screen, the display screen is placed at a distance of about 50 cm from the eye, at this time, the visual range of the eye at 50 cm is about 23562 cm2, and the area of the 20-inch computer display screen is no more than 1200 cm2, the computer display screen is no more than 6% of the visual range of the human eyes. Therefore, the pupil size of the eye is mainly affected by the illumination state of the background environment of the display screen. In order to make the user more comfortable when using the display screen, the brightness of the display screen must be adjusted according to the size of the pupil, that is, being adjusted according to the lighting state of the background environment of the display screen.

Therefore, in a different background environment, if the display screen of the information terminal may adjusts the display according to the external environment, in particular to the display parameters such as the brightness that matches with environment within the viewing angle of a user, and the color temperature, and the visual health of the user to a certain degree will be protected.

The brightness adjustment of the display screen of the information terminal of the present invention is especially suitable for use in a dark lighting environment.

The information terminal of the present invention includes but not limited to a smart phone, a Personal Digital Assistant (PDA), a desktop computer, televisions and projectors.

Figure 1:
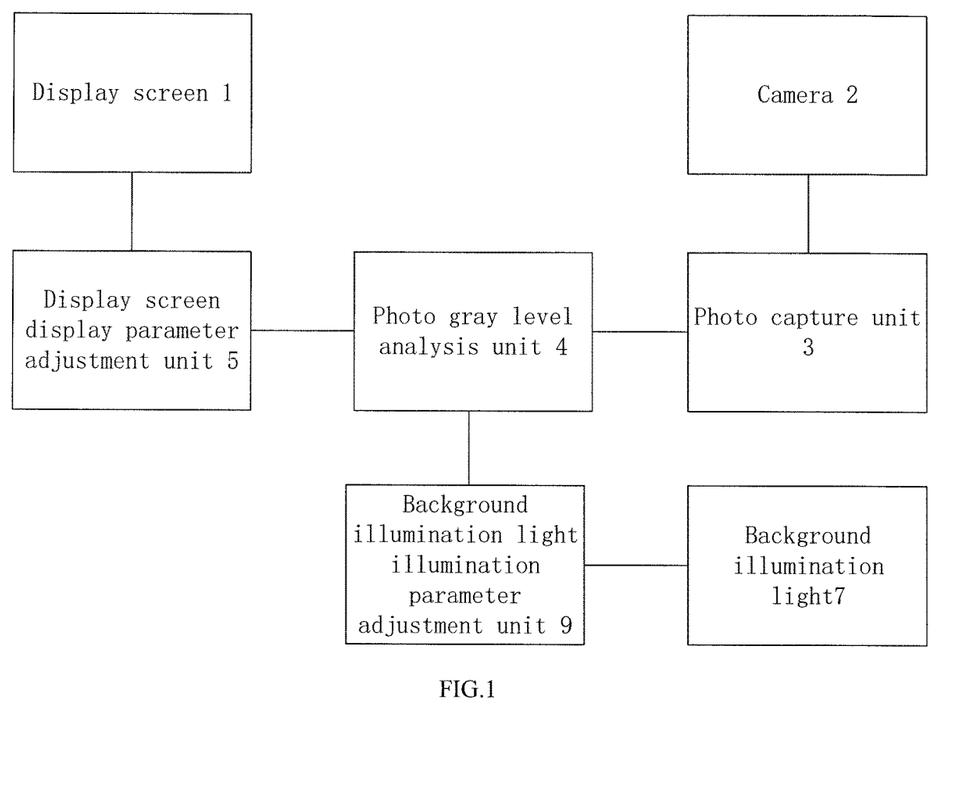
FIG. 1 is a structure schematic diagram of an information terminal provided according to an embodiment of the present invention.
Figure 2:
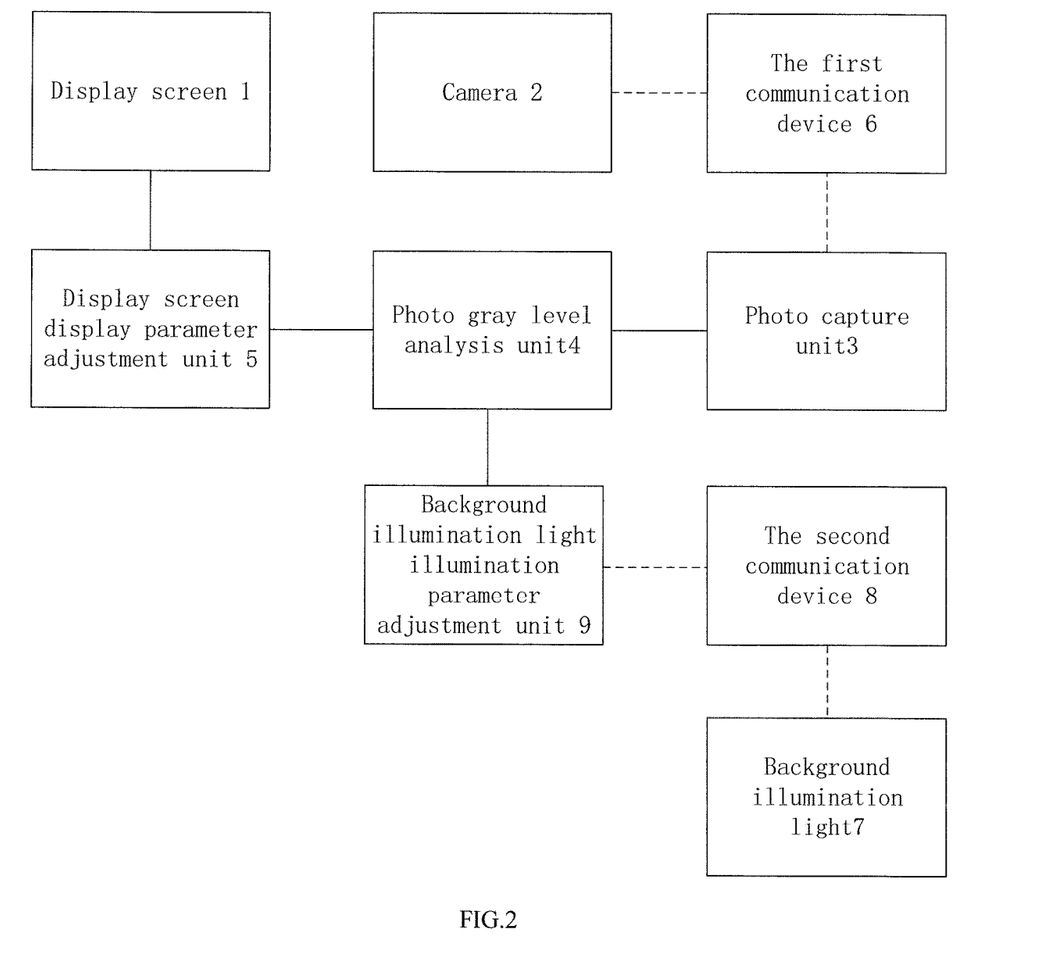
FIG. 2 is a structure schematic diagram of another information terminal provided according to an embodiment of the present invention.

FIG. 1 and FIG. 2 are respectively the schematic diagrams of two embodiments of the information terminal provided according to the embodiment of the present invention. As shown in the figures, the information terminal provided according to the embodiments of the present invention comprises: a display screen 1, a background illumination light 7, a camera 2, a photo capturing unit 3, a photo gray level analysis unit 4, a display-screen display-parameter-adjustment unit 5 and a background illumination light illumination-parameter-adjustment unit 9.

The display screen 1 is for performing image display with the output information of the information terminal. Take a smart phone as an example, there are various display screen 1 available which are different depending on the quality of the liquid crystal display (LCD) and the development technology, and the type of which may roughly include TFT, TFD, UFB, STN and OLED.

The background illumination light 7 is used to perform supplementary lighting of the background environment within the viewing angle range of a user. The background illumination light 7 may be placed in the body of the information terminal and integrated with the information terminal, or it may be disposed separately from the body of the information terminal and placed around the information terminal. For example, as shown in FIG. 2, the second communication device 8 performs data interaction with other modules unit in the body of the information terminal.

The camera 2 is used for acquiring a photo analog signal or a digital signal of a background environment within the viewing angle range of a user. In an embodiment, as shown in FIG. 2, the communication device 6 performs data interaction with other modular units in the body of the information terminal. In order to ensure that the image captured by the camera 2 is consistent with the viewing angle range of the user, the lens optical axis of the camera 2 needs to be set perpendicular to the display screen or set substantially perpendicular to the display screen, which is set within ±30° of the vertical axis of the display screen optical axis. This is because the optical axis of the user's eye when the user is using the information terminal is usually perpendicular or substantially perpendicular to the display screen. Of course, the purpose of this setting is to ensure that the sampling range of the camera 2 is as close as possible to the user's visual range. In a specific application, the settings of the camera 2 can be set according to the actual usage of the user. In particular, as for the placement position of the camera 2, the camera 2 can be integrally disposed on the information terminal, or may be provided separately from the body of the information terminal.

When using an information terminal such as a smart phone or a table computer, the distance between the eyes and the terminal is usually about 30 cm. Since this kind of information terminal is a portable product, it will be moved along with people's activities, the background of the terminal is usually wide-open on these circumstances, in this case, the proper placement position of the camera 2 is integrated on the information terminal. Thereby, under the circumstances where the camera 2 is configured the same angle as the image capturing angle of the user eyes, the background acquired by the camera 2 integrally disposed on the information terminal is close to the background observed within the viewing angle range of the user.

As a user watches TV or projector hanging against the wall, the space of background behind the display screen is very small, and the background object is close to the back face of the display screen, however, the distance between the position of the user's eyes and the display screen is far, usually about more than 2 m or even beyond. In this case, the proper placement position of the camera 2 is arranged near the head of the user as an external camera, and approach the user's eyes. Thereby, under the circumstances where the camera 2 is configured the same angle as the image capturing angle of the user eyes, the illumination state of the background environment obtained by the camera 2 arranged close to the user's eyes is more scientific and accurate.

When using an information terminal such as a desktop computer, the distance between the use's eyes position and computer screen is approximately 50 cm. However, the space of the back of the computer screen is defined by the actual condition, when the computer screen is far away from the background object, the background space range is wide-open, in this case, the proper placement position of the camera 2 is arranged around the desktop computer. However, when the computer screen is close to the background object, the background space range is small, in this case, the proper placement position of the camera 2 is close to the user's eyes. Thereby, it is particularly important to arrange camera 2 in a proper placement position according to the actual situation.

The camera 2 may be CCD or CMOS sensor. Those two kinds of image sensor are commonly used at present, both of which use photodiodes for photoelectric conversion to collect image information, and the main difference is that data is transmitted in different ways. The charge data of each pixel in each row of the CCD sensor is sequentially transferred to the next pixel, output by the bottommost portion, then amplified and output by the amplifier at the edge of the sensor. However, in the CMOS sensor, each pixel will be adjacent to an amplifier and A/D conversion circuit, and output data in a manner similar to a memory circuit.

The photo capturing unit 3 is arranged inside the information terminal, and connected to the camera 2 by wire connection through a first communication device 6 as shown in FIG. 1, or through the first communication device 6 via wirelessly connection as shown in FIG. 2. The photo capture unit 3 coverts the photo analog signal or the photo digital signal acquired by the camera 2 into digital photo data.

The photo gray level analysis unit 4 is connected to the photo capture unit 3, analyzes the gray level of the photo data transmitted by the photo capture unit 3, and generates state parameters of the background environment within the viewing angle range of the user according to configuration parameters of the camera, and sends the same to the display-screen display-parameter-adjustment unit 5 and the background illumination light illumination-parameter-adjustment unit 9.

The photo gray analysis unit 4 is a module having data processing function such as processing chip or circuit unit with particular logic, which performs analyzing the gray level of the photo data to determine the illuminate state of the background environment, for generating the corresponding state parameters.

The background illumination light illumination-parameter-adjustment 9 is connected to the photo gray level analysis unit 4, and is connected with the background illumination light 7 by wire connection or by wirelessly connection via a second communication device 8. The illumination parameter of the background illumination light 7 is adjusted according to the state parameters, so that the illumination state of the background environment reaches to the preset parameter. The fill light of the background environment is changed by changing the illumination parameters of the background illumination light 7, it is possible that the light of the background environment reaches to the required preset parameters. The preset parameter here is not necessarily a fixed parameter, but it may be a target parameter according to the actual light of the current background environment. The above illumination parameters of the background illumination light at least include brightness and/or color temperature.

The display-screen display-parameter-adjustment unit 5 is connected to the photo gray level analysis unit 4 and the display screen 1 respectively. The display-screen display-parameter-adjustment unit 5 adjusts the display parameters of the display screen according to the state parameters of the background environment on the basis of the preset corresponding relationship, so that the display parameters of the display screen match with the illumination state of the background environment within the viewing angle range of the user which is adjusted by the fill light of background illumination. The display parameters of the display screen include at least brightness and/or color temperature.

It should be understood that, during shooting different parameters of the camera lens such as aperture, shutter speed, focal length will have certain influence on the sampling image of the background environment, which may cause the background sampling image to be different from the actual one.

Therefore in a Preferably embodiment, in accordance with the capture parameters of the camera lens, A correction calculation of the display parameter of the display screen is performed based on a preset algorithm, thereby, the deviation caused by sampling is corrected, so that the display screen is matched with an actual illumination state of the background environment within the viewing angle range of the user according to the corrected display parameters.

In this embodiment, that the parameter control of the display screen is to control an actual display. In this process, the difference in image capturing between the lens model of different manufacturers and the self-compensation of the image is considered.

Take the brightness control as an example, the brightness of the actual display is controlled. We employ a method of control the maximum brightness percentage to control the brightness of the actual display, it includes determining an absolute value of a target brightness according to the state parameters of background environment and a preset correspondence relationship, determining a display brightness percentage of the display screen according to the absolute value of the target brightness, according to the brightness percentage outputting an actual display brightness corresponding to the absolute value of the target brightness, wherein, the maximum absolute value of brightness of the display screen are calibrated in advance through the brightness percentage to obtain the actual display brightness of the display screen.

Furthermore, according to the type parameter of the camera and/or self-compensation the photo capturing unit 3 generates a counter-compensation parameter, and converts the photo analog signal or the photo digital signal acquired by the camera into digital photo data based on the counter-compensation parameter.

In the embodiment, there is a preset correspondence relationship between the ambient light conditions of the background environment and the display parameters of the display screen, and the data of the correspondence relationship may be stored locally in the information terminal or stored in the cloud.

Further the local store storage may be stored in a memory (not shown in the figures) of the information terminal. The memory can be a ROM chip or any other type of solid state non-volatile semiconductor memory. The manner of writing into the memory can be implemented by a wired input method, or by an interface connected to the memory, such as an infrared interface, a Bluetooth interface, a USB interface etc.

The preset correspondence relationship may include a correspondence relationship of the state parameters for adjusting the brightness obtained by the gray level analysis result, and a correspondence relationship of the state parameters for adjusting the color temperature obtained by the gray level analysis result.

There is an achievable method relating to a method for determining the state parameters for adjusting brightness from the gray level analysis, presented in this embodiment.

A black and white camera is used to take a picture of the background environment within the viewing angle range of the user, a black and white photo is obtained, the image data of this black and white photo is taken out, and divided into M×N blocks, for example, assuming 10×10 blocks, and the quantization parameter of each block is determined, for example, black is defined to 0 and white to 1, the number of levels in each block area is counted and accumulated, and the total number of stage 10×10 is divided to obtain the percentage, which is the brightness ratio of the black and white photo. For example, in the above example, 50 blocks are black and 50 blocks are white, and the brightness ratio is 50%. Thereby, the brightness ratio obtained by the black and white analysis combined with the setting parameters of the black and white camera can generate the brightness state parameters of background environment within the viewing angle range of the user.

A black and white camera is used to take a picture of the background environment within the viewing angle of the user, a black and white photo is obtained, the image data of this black and white photo is taken, and divide into M×N blocks, for example, assuming 10×10 blocks, and the gray value of each block area is quantified, usually the 256 level are divided from 0 to 255, wherein, 0 is the darkest (black) and 255 is the brightest (white), the number of the gray levels are analyzed and counted and accumulated in each block, and the total level 10×10×256 are divided to obtain the percentage, which is the brightness ratio of the black and white photo. Thereby, the brightness ratio obtained by the gray analysis combined with the setting parameters of the black and white camera can generate the brightness state parameters of background environment within the viewing angle range of the user.

Alternatively, the gray level may be divided into smaller number of levels such as 8 levels, to perform the calculation.

There is an achievable method for determining the state parameters for adjusting the brightness and the color temperature from the result of the gray level analysis, in this embodiment.

A color camera is utilized to take a picture of the background environment within the viewing angle range of a user, a color photo is obtained, the image data of this color photo is extracted, and the photo is decomposed into three photos with color of red, green and blue by means of RGB three primary color decomposition function, average value of the R/G/B channel components of the three photo is converted into the gray value according to weighted correspondence relationship. Then the image data of the red component photo is extracted, the photo is divided into M×N blocks, for example, assuming 10×10 blocks, and the gray value of each block is quantized, usually the level is divided into 256 from 0 to 255, of which, 0 is the darkest (black), 255 is the brightest (white), the number of the gray levels is counted and accumulated in each block, and the total level 10×10×256 is divided to obtain the percentage, which is the brightness ratio of the red component photo. Similarly, the brightness ratio of the green component photo and the blue component photo may be analyzed and calculated. Finally, the brightness ratio of the three photos is superimposed to obtain the brightness ratio of the color photo. Thereby, the brightness ratio obtained by the gray analysis combined with the setting parameters of the color camera may generate the brightness state parameters of background environment within the viewing angle range of the user.

Then, the photos of the three color components decomposed by the color camera are combined, the R/G/B channel components of each region is analyzed and statistic, the channel component is the remainder after synthesizing the standard valid white pixel, if the red component is large, the photo tends to be warm; if the blue component is large, the photo tends to be cold. Thereby, by means of analyzing the component ratio of the R/G/B color the color temperature state parameters of the specific color photograph may be obtained. Thereby, the brightness and color temperature state parameters obtained by the gray analysis combining with the setting parameter of the color camera may generate the brightness and color temperature of the background environment within viewing angle range of the user.

Furthermore, the display screen display parameter adjustment unit 5 comprises a first adjustment device which is used to change the preset corresponding relationship to match the display parameters of the display screen with the illumination state of the background environment within the viewing angle range of the user. The first adjustment device (not shown in the FIG) may be a hardware module disposed inside the information terminal, or the software module installed on the display screen.

Furthermore, the background illumination light illumination-parameter adjustment unit 9 comprises a second adjustment device (not shown in the FIG) which is used to adjust the illumination parameter of the background illumination light 7 so that the illumination state of the background environment reaches to the preset parameter. The second adjustment device (not shown in the FIG) may be a hardware module disposed inside the information terminal, or a software module installed on the display screen for controlling the background illumination light 7.

Figure 3:
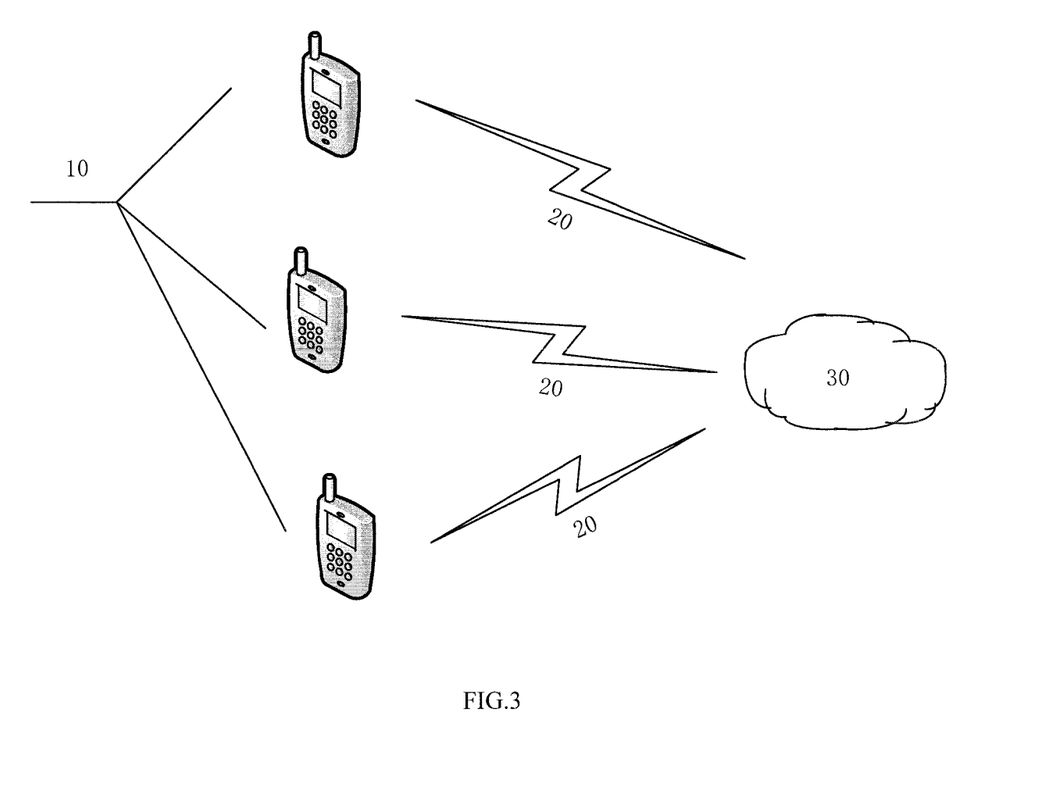
FIG. 3 is a structure diagram of the system with multiple information terminal provided according to an embodiment of the present invention.

Additionally, as shown in the FIG. 3, in a system connected to the cloud, each information terminal 10 may connect to the cloud 30 through a network 20, and will be used to transmit the parameters of preset corresponding relationship in which the display screen parameter of the display screen 1 match with the illumination state of the background environment within the viewing angle of the user, to the cloud 30 for synchronizing. Similarly, the cloud 30 may synchronize the parameters of preset corresponding relationship in which the display screen parameter of the display screen 1 match with the state of the background environment within the viewing angle range of the user.

The cloud stores the user habit list corresponding to the user. The user habit list comprises a user ID corresponding to the user, display parameters of the display screen, illumination parameter of the background light, illumination state and preset corresponding relationship in which the display parameters match with the illumination state of the background environment within the viewing angle range of the user.

Through the data upload by the terminal, the cloud may obtain the use ID, the display parameters of the display screen, the illumination parameter of the background light, the illumination state and the preset corresponding relationship between the display parameter and the illumination state of the background environment within the viewing angle range of the user. Then a user habit record is generated, and recorded in the user habit list. Wherein, there are many methods for generating the corresponding relationship, and the method may be generated according to user statistical analysis, a predetermined algorithm, a predetermined model and so on. By means of each user's adjustment record, a very complete user habit list may be generated, so that when the terminal device used by the user is in a certain illumination state, the display parameters of the display screen suitable for the user based on the user habit list may be directly obtained.

Further, the cloud 30 may perform big data statistics and analysis with the preset correspondence relationship data to provide data for multiple information terminals 10 accessing the cloud 30. The Cloud 30 may perform big data analysis on parameters of the preset correspondence relationship of the display screen background light from multiple information terminals 10, and generate the parameters of preset correspondence relationship adaptive to the common and the minority, so that each information terminal 10 synchronizes the respective common and minority required parameters of the preset correspondence relationship between the display parameters of display screen and the illumination state of the background environment within the viewing angle range of the user through the Cloud 30.

Each information terminal 10 may also synchronize display parameters of the display screen and the background light of the display within the viewing angle range of the user respectively required by the common and minority, that is the preset corresponding relationship parameter which matches with the state of the illumination state of the background environment.

The above process is a self-adaptive adjustment process between the display parameters based on the cloud data and the illumination state of the background environment, as well as the illumination parameters of the backlight.

Further, in a Preferably embodiment, the first adjustment device and the second adjustment device may also be used to implement the corresponding parameter adjustment process according to the individualized requirement after the adaptive adjustment.

Take the personalized adjustment of display parameters of the display screen and the background environment illumination state as an example. The personalized adjustment method of illumination parameters of background illumination light may refer to this example.

The user adjusts the parameters of the display screen through the first adjustment device according to the perception of the background lighting and the display parameter of the display screen based on the display parameters of the display screen after the adaptive adjustment. After the information terminal 10 receives the display parameter adjustment, it sends the corrected parameters of the display screen and the illumination state parameterss of the background environment within the viewing angle range of the user to the cloud 30, and loads the user information recorded by the information terminal in the uploading data processing, such as the gender, age and occupation of the user, to classify and summarize the data. And the cloud 30 according to the received data, changes the original preset correspondence relationship, which is corresponding to the correspondence display parameters of the user under the background illumination parameters, and generates the corrected correspondence relationship.

In a specific calculation method, the cloud calculates the degree and amount of deviation between the corrected correspondence relationship and the preset correspondence relationship, and performs weight processing on the preset correspondence relationship and the corrected corresponding relationship that reaches the first deviation amount and less than the first deviation threshold, thereby it generates a universal preset correspondence relationship of the first range.

Weight processing on the preset correspondence relationship and the corrected correspondence relationship that reaches the second deviation amount and less than the second threshold is performed, thereby a peculiar preset correspondence relationship of the second rang is generated.

That is, in the above-mentioned algorithm, the data whose deviation degree is smaller than the first deviation threshold and the number of samples which reaches the first deviation amount are employed to calculate the universal preset correspondence relationship of the first range. And the data whose deviation degree is larger than the first range and smaller than the second range and the number of samples which reaches the second deviation amount is employed to calculate the peculiar preset correspondence relationship of the second range.

When generating a universal preset correspondence relationship which is adaptable to the first range and a peculiar preset correspondence relationship adaptable to the second range, and obtaining the universal preset correspondence relationship of the first range and the peculiar preset correspondence relationship of the second range through the normalization processing. The cloud may further consider giving different data correction weight coefficients according to the different user attributes. It includes the cloud determines the user properties corresponding to the corrected correspondence relationship, determines the data correction weight coefficient according to the user properties, performs the data analysis processing on the parameter of the corrected correspondence relationship according to the data correction weight coefficient, obtains parameters of a normalized correction correspondence relationship, performs data analysis on the correspondence relationship in which the display parameter of display screen matches the lighting state of the background environment within the viewing angle range of the user and the parameters of a normalized correction correspondence relationship, and generates the universal preset correspondence relationship adaptable to the first range and the particular preset correspondence relationship adaptable to the second range.

The personalized parameter adjustment may further change the universal preset correspondence relationship of the Cloud.

When the display parameter correspondence relationship of a certain user under a certain lighting state of background environment is corrected, the statistics data of the universal preset correspondence relationship under this lighting state of the background environment based on the big data analytics is changed. The universality calculation at this time needs to be considered the parameters of the preset correspondence relationship from multiple information terminals, and the parameters of the corrected correspondence relationship of the information terminal from the personalized user to perform data analysis, thereby, a new universal preset correspondence relationship and a new particular preset correspondence relationship adaptive to the minority are generated.

Therefore, after the self-adaptive parameters' adjustment, the users perform data collection for personalized adjustment to the display parameters of the information terminals, and with the collection the universal preset correspondence relationship will be dynamically adjusted, and tend to be a reasonable range that the common can accept.

Similarly, the dynamic adjustment of the particular preset correspondence relationship for a particular niche will also change correspondingly with the user customized display data. However, it should be noted that difference between the particular preset correspondence relationship and the universal preset correspondence relationship, is that the data base is different from data base which is based on as the universal preset correspondence relationship is adjusted, because the particular preset correspondence relationship is only related to certain special groups, such as the woman aged 20-30, and children under 16 in Beijing city etc., as adjusting the particular preset correspondence relationship of the specific groups, the sampling range of data to be corrected is merely the specific group. Therefore, on basis of the user's customized parameter adjustment, the change of the parameters of the universal preset correspondence relationship and the particular preset corresponding relationship must be different.

Additionally, the first adjustment device may recognize the adjustment command that is inputted by the user. In the case that adjustment is occurred for first time, as the user inputs an adjustment command through the first adjustment device, the first adjustment device may parse such input command as a request for a universal match, to obtain the universal preset parameters from the cloud.

If the adjustment command is input by the user in a period of time after the configuration of the universal match is finished, it may be deemed that the operation is triggered by the user continually. For an instance, when the user continually enters a command, three times in a second, to increase the brightness the command may be identified to increase the brightness by three levels.

A person skilled in the art will appreciate that the individualized adjustment method for the illumination parameters of the background illumination light can be performed based on the above description with reference to this example as well. The same part will not be repeated here.

The method for personalized adjustment of the illumination parameters of the background illumination light may further comprise configuring a switching threshold of the background illumination light, and determining whether the switching threshold is reached by collecting the environment parameters. For example, when the environment brightness is lower than minimum of the switching threshold, it is detected whether the background illumination light is turned on, and if it is not turned on, then it turns on automatically, and the above-mentioned process for acquiring the universal preset parameters is executed, for matching illumination parameters of background illumination light with display parameters of the display screen. When the environment brightness is higher than the maximum value of the switching threshold, it is detected whether the background illumination light is turned on, and if it is turned on, then it turns off automatically, the process for acquiring universal preset parameters is executed again for match process of the display parameters of the display screen.

Furthermore, when the environment brightness is lower than the minimum of the threshold range, the background illumination light may turn on automatically, and output the corresponding illumination parameters according to the state parameters of the background environment on the basis of the preset corresponding relationship between background light (original environment light) and compensating light (the light of background illumination light), and thereby the display parameters of the display screen is matched with the adjusted illumination state of the background environment within the viewing angle range of the user.

After the background illumination light compensates the environment brightness, the compensated environment illumination is continuously detected by the information terminal. The compensated light emitted by the background illumination light will decrease as the environment illumination parameters become better. And when the compensation light reaches to the maximum of the environment brightness threshold range, the compensation illumination of background illumination light will be turned off.

The embodiments of the present invention provide an information terminal, which may sample illumination of a background environment based on viewing angle ranges of a user, control the compensated light illumination of the background environment according to state parameters of the background environment obtained by sampling, and adjust the display parameters such as brightness and the color temperature etc., for matching with the state parameters of the background environment within the viewing angle ranges of the user, so that it is possible for the screen display to match with the visual perception of the user, and the visual fatigue of the user during use is effectively reduced and the visual health of the user is protected.

A person skilled in the art should be further understood that the units and algorithm steps of each example described in connection with the embodiments disclosed herein can be implemented in electronic hardware, computer software or a combination of both, in order to clearly illustrate the alternative of hardware and software, the composition and steps of the examples have been generally described in terms of functions in the above description. Whether these functions are performed in hardware or software depends on the specific application and design constraints of technical solutions. A person skilled in the art can use different methods for implementing the described functions for each particular application, but such implementation should not be considered to be beyond the scope of the present invention.

The steps of the method or algorithm described in connection with the embodiments disclosed herein can be implemented in hardware, a software module executed by a processor, or a combination of both. The software module can be placed in random access memory (RAM), memory, read only memory (ROM), electrically programmable ROM, electrically erasable programmable ROM, registers, hard disk, removable disk, CD-ROM, or any other form of storage medium known in the art.

Above mentioned specific embodiments further describe aims, technical solutions and beneficial effects of the invention in detail, it should be understood that the above mentioned is merely specific embodiment of the present invention without limiting a protection scope of the present invention, and any modifications, equivalent substitutions, improvement, etc. made within the spirit and principle of the present invention should be included in the scope of the present invention.

What is claimed is:

1. An information terminal comprising a display screen, a first communication device and a second communication device wherein the information terminal further comprises a background illumination light, a camera, a photo capturing unit, a photo gray level analysis unit, a display-screen display-parameter-adjustment unit and a background-illumination-light illumination-parameter-adjustment unit, the background illumination light is used for illuminating a background environment within a viewing angle range of a user, the camera is used for acquiring a photo analog signal or a photo digital signal of the background environment within the viewing angle range of the user, the photo capturing unit is connected to the camera via the first communication device for converting the photo analog signal or the photo digital signal acquired by the camera into digitized photo data, the photo gray level analysis unit is used for analyzing a gray level of the photo data, and generating a state parameters of the background environment within the viewing angle range of the user according to configuration parameters of the camera, and respectively sending the same to the background-illumination-light illumination-parameter-adjustment unit and the display-screen display-parameter-adjustment unit, the background-illumination-light illumination-parameter-adjustment unit is connected to the background illumination light via the second communication device, for adjusting illumination parameters of the background illumination light according to the state parameters, so that the illumination state of the background environment reaches to a preset parameter, wherein the illumination parameters at least include a brightness and/or a color temperature, the display-screen display-parameter-adjustment unit adjusts the display parameters of the display screen according to the state parameters of the background environment on the basis of a preset corresponding relationship, so that the display parameters of the display screen match with the illumination state of the background environment within the viewing angle range of the user, wherein the display parameters at least include a brightness and/or a color temperature, wherein the information terminal is connected to the cloud through a network, for transmitting parameters of the preset corresponding relationship in which the display parameters of the display screen match with the illumination state of the background environment within the viewing angle range of the user to the cloud for synchronization, the cloud stores a user habit list corresponding to the user which includes a user ID corresponding to the user, display parameters of the display screen, illumination parameters and an illumination state of a background light, and a preset corresponding relationship in which the display parameters match with the illumination state of the background environment within the viewing angle range of the user, and wherein the display-screen display-parameter-adjustment unit comprises a first adjustment device is used for adjusting the display parameters of the display screen, and changing the preset corresponding relationship between the display parameters of the display screen and the illumination state of the background environment within the viewing angle range of the user after adjusting the display parameters, to generate a first corrected corresponding relationship, wherein, the first adjustment device is a hardware module disposed in the information terminal, or a software module disposed on the display screen, the cloud performs data analysis on parameters of the preset corresponding relationship of the background environment and parameters of the first corrected corresponding relationship from several information terminals, generates a universal state preset parameter adapted to a first range and a peculiar state preset parameter adapted to a second range, for the information terminals to acquire the universal state preset parameter or the peculiar state preset parameter which are corresponding to the background environment from the cloud.

2. The information terminal according to claim 1, wherein the information terminal is connected to the cloud through a network, for transmitting the state parameters of the background environment to the cloud for synchronization, storing the same as a state preset parameter.

3. The information terminal according to claim 1, wherein the state parameters of the background environment at least include a brightness parameter and/or a color temperature parameter.

4. The information terminal according to claim 1, wherein that the background-illumination-light illumination-parameter-adjustment unit is connected to the background illumination light via the second communication device, for adjusting illumination parameters of the background illumination light according to the state parameters, so that the illumination state of the background environment reaches to a preset parameter comprises:

the background-illumination-light illumination-parameter-adjustment unit determines whether an ambient illumination parameter is lower than a minimum of the set illumination parameter according to state parameters of the background environment within the viewing angle range of the user, if not lower than the minimum of the set illumination parameters, the background illumination light is not turned on, if lower than the minimum of the set illumination parameter, based on the preset corresponding relationship between the background illumination light and a compensated light, the background illumination light outputs corresponding illumination parameters according to the state parameters of the background environment, so that the display parameters of the display screen match with the illumination state of the adjusted background environment within the viewing angles range of user.

5. The information terminal according to claim 1, wherein that adjusts the display parameters of the display screen according to the state parameters of the background environment comprises:

determining an absolute value of a target brightness of the display screen according to the state parameters of the background environment and the preset corresponding relationship, determining a display brightness percentage of the display screen according to the absolute value of the target brightness of the display screen, outputting an actual display brightness of the display screen corresponding to the absolute value of the target brightness of the display screen according to the display brightness percentage of the display screen, wherein the actual display brightness of the display screen and the maximum of the absolute value of the brightness of the display screen are calibrated with the display brightness percentage in advance.

6. An information terminal comprising a display screen, a first communication device and a second communication device wherein the information terminal further comprises a background illumination light a camera a photo capturing unit a photo gray level analysis unit, a display-screen display-parameter-adjustment unit and a background-illumination-light illumination-parameter-adjustment unit, the background illumination light is used for illuminating a background environment within a viewing angle range of a user, the camera is used for acquiring a photo analog signal or a photo digital signal of the background environment within the viewing angle range of the user, the photo capturing unit is connected to the camera via the first communication device for converting the photo analog signal or the photo digital signal acquired by the camera into digitized photo data, the photo gray level analysis unit is used for analyzing a gray level of the photo data, and generating a state parameters of the background environment within the viewing angle range of the user according to configuration parameters of the camera, and respectively sending the same to the background-illumination-light illumination-parameter-adjustment unit and the display-screen display-parameter-adjustment unit, the background-illumination-light illumination-parameter-adjustment unit is connected to the background illumination light via the second communication device, for adjusting illumination parameters of the background illumination light according to the state parameters, so that the illumination state of the background environment reaches to a preset parameter, wherein the illumination parameters at least include a brightness and/or a color temperature, the display-screen display-parameter-adjustment unit adjusts the display parameters of the display screen according to the state parameters of the background environment on the basis of a preset corresponding relationship, so that the display parameters of the display screen match with the illumination state of the background environment within the viewing angle range of the user, wherein the display parameters at least include a brightness and/or a color temperature, wherein the information terminal is connected to the cloud through a network, for transmitting parameters of preset corresponding relationship in which the display parameters of the display screen match with the illumination state of the background environment within the viewing angle range of the user to the cloud for synchronization, the cloud stores a user habit list corresponding to the user which includes a user ID corresponding to the user, display parameters of the display screen, illumination parameters and an illumination state of the background light, and a preset corresponding relationship in which the display parameters match with the illumination state of the background environment within the viewing angle range of the user, wherein the background-illumination-light illumination-parameter-adjustment unit comprises: a second adjustment device for adjusting the illumination parameters of the background illumination light, and after adjusting the illumination parameters, changing the preset corresponding relationship between the display parameters of the display screen and the illumination state of the background environment within the viewing angle range of the user, to generate a second corrected corresponding relationship, wherein, the second adjustment device is a hardware module disposed in the information terminal, or a software module disposed on the display screen, and wherein the information terminal is connected to the cloud through network, for transmitting the preset corresponding relationship in which the display parameters of the display screen match with the illumination state of the background environment within the viewing angle range of the user and the parameters of the second corrected corresponding relationship to the cloud, and the cloud performs data analysis on parameters of the preset corresponding relationship and the parameters of the second corrected corresponding relationship from several information terminals, generating universal preset corresponding relationship parameters adapted to a first range and peculiar preset corresponding relationship parameters adapted to a second range, for the information terminals to acquire the universal preset corresponding relationship parameters or the peculiar preset corresponding relationship parameters in which the display parameters of the display screen match with the illumination state of the background environment within the viewing angle range of the user from the cloud.

7. The information terminal according to claim 6, wherein the information terminal is connected to the cloud through a network, for transmitting the state parameters of the background environment to the cloud for synchronization, storing the same as a state preset parameter.

8. The information terminal according to claim 6, wherein the state parameters of the background environment at least include a brightness parameter and/or a color temperature parameter.

9. The information terminal according to claim 6, wherein that the background-illumination-light illumination-parameter-adjustment unit is connected to the background illumination light via the second communication device, for adjusting illumination parameters of the background illumination light according to the state parameters, so that the illumination state of the background environment reaches to a preset parameter comprises:

the background-illumination-light illumination-parameter-adjustment unit determines whether an ambient illumination parameter is lower than a minimum of the set illumination parameter according to state parameters of the background environment within the viewing angle range of the user, if not lower than the minimum of the set illumination parameters, the background illumination light is not turned on, if lower than the minimum of the set illumination parameter, based on the preset corresponding relationship between the background illumination light and a compensated light, the background illumination light outputs corresponding illumination parameters according to the state parameters of the background environment, so that the display parameters of the display screen match with the illumination state of the adjusted background environment within the viewing angles range of user.

10. The information terminal according to claim 6, wherein that adjusts the display parameters of the display screen according to the state parameters of the background environment comprises:

determining an absolute value of a target brightness of the display screen according to the state parameters of the background environment and the preset corresponding relationship, determining a display brightness percentage of the display screen according to the absolute value of the target brightness of the display screen, outputting an actual display brightness of the display screen corresponding to the absolute value of the target brightness of the display screen according to the display brightness percentage of the display screen, wherein the actual display brightness of the display screen and the maximum of the absolute value of the brightness of the display screen are calibrated with the display brightness percentage in advance.

\* \* \* \* \*